United States Patent [19]

Eller

[11] Patent Number: 4,665,691

[45] Date of Patent: May 19, 1987

[54] EXHAUST BACK PRESSURE REDUCER

[76] Inventor: Harold E. Eller, Box 546, Bermuda Run, N.C. 27006

[21] Appl. No.: 843,260

[22] Filed: Mar. 24, 1986

[51] Int. Cl.⁴ .............................................. B60K 13/04
[52] U.S. Cl. .................................... 60/316; 180/89.2; 180/296
[58] Field of Search .......................... 60/316, 319, 317; 180/89.2, 296

[56] References Cited

U.S. PATENT DOCUMENTS

| | | |
|---|---|---|
| 1,635,938 | 7/1927 | Hudson . |
| 2,112,534 | 3/1938 | Keen .................... 60/316 |
| 2,242,494 | 5/1941 | Wolf .................... 180/296 |
| 2,386,305 | 10/1945 | Flickinger .............. 181/43 |
| 2,500,510 | 3/1950 | Barnes . |
| 3,043,097 | 7/1962 | Inman et al. . |
| 3,045,421 | 7/1962 | Pagliuca . |
| 3,683,624 | 8/1972 | Williams ................ 60/316 |
| 3,857,458 | 12/1974 | Ohtani et al. ........... 181/43 |
| 4,029,167 | 6/1977 | Fox .................... 180/89.2 |
| 4,143,731 | 3/1979 | Haustein ............... 180/89.2 |
| 4,227,651 | 10/1980 | Abe .................... 239/428 |
| 4,335,575 | 6/1982 | Pagliuca ................ 60/319 |
| 4,465,154 | 8/1984 | Hinderks ............... 180/296 |

*Primary Examiner*—Douglas Hart
*Attorney, Agent, or Firm*—Senniger, Powers, Leavitt and Roedel

[57] ABSTRACT

An exhaust back pressure reducer for use with an air deflector on top of the cab of a tractor for deflecting air over the tractor as the tractor pulls the trailer over the road. The back pressure reducer generally comprises a device at the top of the air deflector on the cab for aspirating exhaust gas from the engine exhaust system to reduce the exhaust back pressure on the engine. The aspirating device is positioned for flow therepast of air relative to the air deflector as the tractor travels forward and ported for suctioning gas therefrom by the air flowing therepast. The exhaust back pressure reducer further includes a connection between the engine exhaust system and the aspirating device for aspiration of exhaust gas from the exhaust system as the tractor travels forward over the road with attendant relative flow of air up and back over the air deflector and the aspirating device on top of the cab.

14 Claims, 7 Drawing Figures

EXHAUST BACK PRESSURE REDUCER

BACKGROUND OF THE INVENTION

This invention relates generally to exhaust back pressure reducers for internal combustion engines, and more particularly to such a reducer for the engine of a truck tractor for pulling a trailer.

Various back pressure reducers have been developed to increase the efficiency and power of internal combustion engines. For example, U.S. Pat. Nos. 4,335,575 and 3,045,421 disclose exhaust back pressure reducers comprising a venturi throat that takes advantage of air flow over a moving vehicle. U.S. Pat. No. 2,500,510 discloses an exhaust pressure reducer comprising a "box-like vacuum chamber" having an opening at its front wall for an engine exhaust pipe (col. 1, lns. 39–45). Air flow over the moving vehicle is deflected downwardly under the vacuum chamber by an angular baffle plate, thereby creating suction therein for reducing back pressure (col. 2, lns. 13–27).

While utilizing the venturi effect to improve efficiency of an engine is desirable, the particular designs described above do not take advantage of various features of truck tractors (semi tractors), such as a low pressure zone created by air deflectors typically installed on such tractors.

SUMMARY OF THE INVENTION

Among the several objects of the invention may be noted the provision of an improved exhaust back pressure reducer, particularly for reducing the exhaust back pressure of the internal combustion engine of a truck tractor for pulling a trailer, thereby to improve the fuel efficiency of such vehicles, especially on the long hauls which such vehicles may make; and the provision of such a reducer which is in itself of relatively low cost and which may be installed at relatively low cost.

The exhaust back pressure reducer of this invention takes advantage of the air deflector conventionally used on top of the cab of a tractor for deflecting air over the tractor as the tractor pulls the trailer over the road. The back pressure reducer generally comprises means at the top of the air deflector on the cab for aspirating exhaust gas from the engine exhaust system to reduce the exhaust back pressure on the engine. The aspirating means is positioned for flow therepast of air relative to the air deflector as the tractor travels forward and ported for suctioning gas therefrom by the air flowing therepast. The exhaust back pressure reducer further includes means for connecting the engine exhaust system to the aspirating means for aspiration of exhaust gas from the exhaust system as the tractor travels forward over the road with attendant relative flow of air up and back over the air deflector and the aspirating means on top of the cab.

Other objects and features will be in part apparent and in part pointed out hereinafter.

BRIEF DESCRIPTION OF THE DRAWINGS

Corresponding reference characters indicate corresponding parts throughout the several views of the drawings.

DESCRIPTION OF PREFERRED EMBODIMENTS

Figure 1:
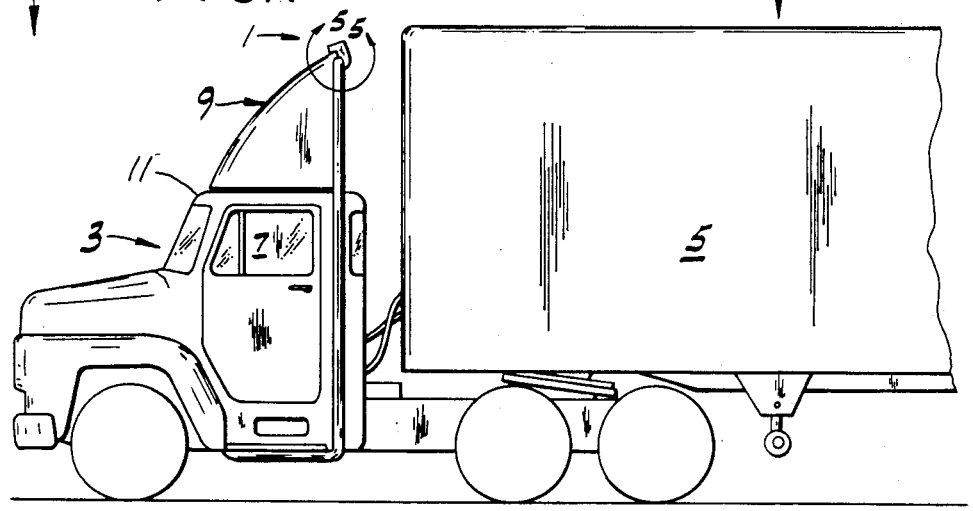
FIG. 1 is a side elevation, broken away to reduce the length of the view, of a tractor equipped with the invention, illustrating a trailer pulled by a tractor.
Figure 2:
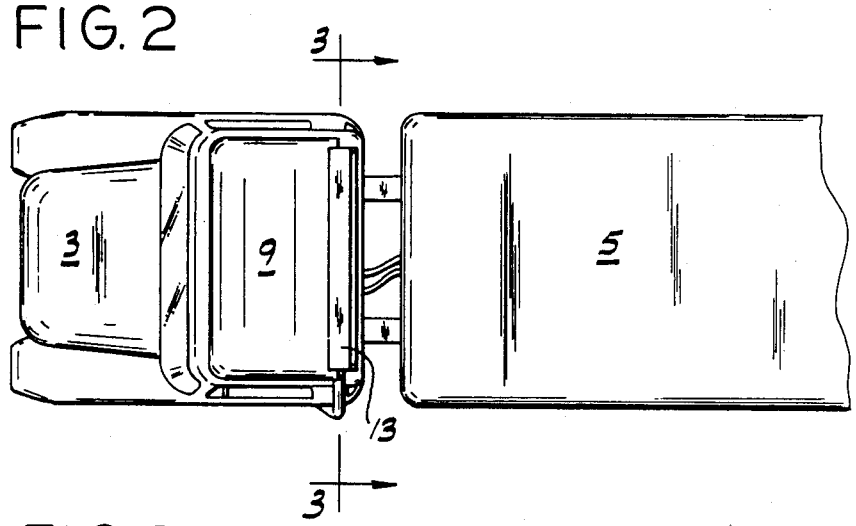
FIG. 2 is a plan generally on line 2—2 of FIG. 1.

Referring to the drawings, an exhaust back pressure reducer of the present invention is designated in its entirety by reference numeral 1. As illustrated in FIGS. 1 and 2, reducer 1 is particularly adapted to improve the efficiency of the internal combustion engine of a truck tractor generally indicated at 3 for pulling a trailer generally designated 5.

Truck tractor 3 has a cab 7 and an air deflector 9 on the top 11 of the cab for deflecting air over the top of the trailer 5 as the tractor pulls the trailer over the road. The back pressure reducer 1 takes advantage of air flow over the air deflector 9 to reduce the back pressure within the exhaust system, thereby improving the efficiency of the engine.

Figure 3:
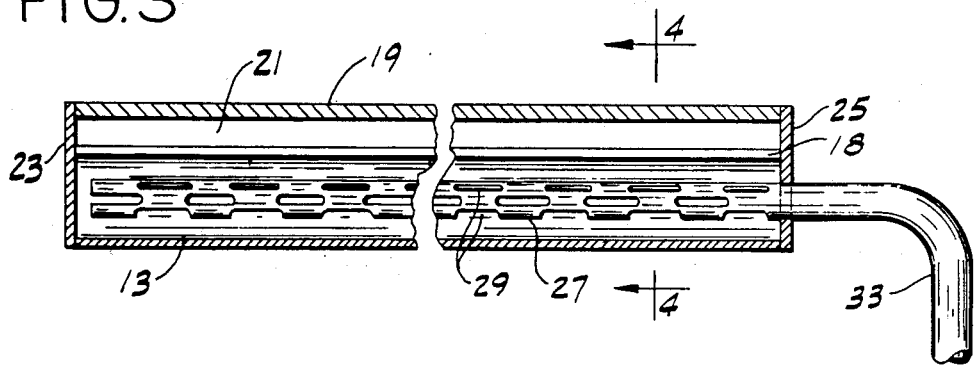
FIG. 3 is an enlarged cross sectional view, broken away to reduce the length of the view, taken along line 3—3 of FIG. 2.
Figure 4:
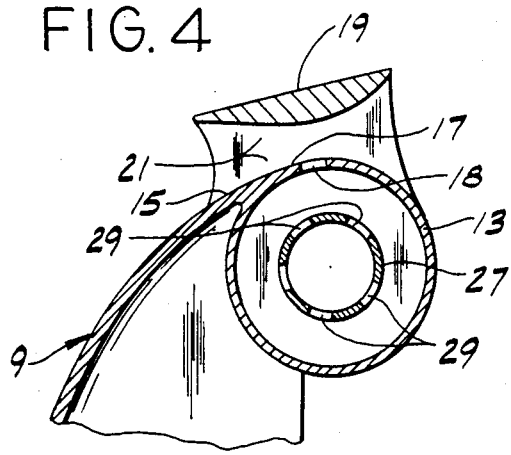
FIG. 4 is an enlarged cross sectional view taken along line 4—4 of FIG. 3.
Figure 5:
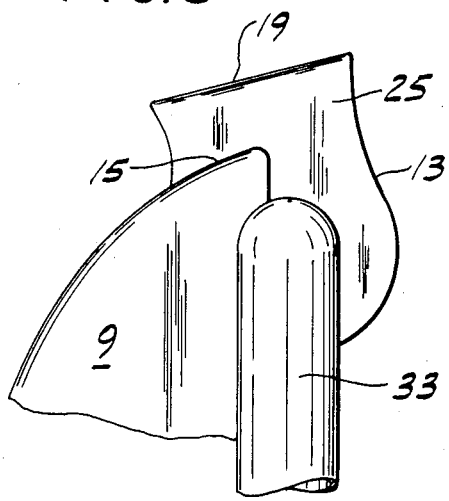
FIG. 5 is an enlarged partial side view along 5—5 of FIG. 1.

As shown in FIGS. 2 and 3, the exhuast back pressure reducer 1 comprises a plenum chamber 13, constituting chamber-forming means, located adjacent the upper edge 15 of the air deflector 9 and extending laterally of the tractor 3. Preferably, plenum chamber 13 has an elongate cylindrical form and is integrally formed with air deflector 9 with the top 17 of the chamber tangent to, or at least at the level of, upper edge 15, as shown in FIGS. 4 and 5. Plenum chamber 13 is ported at its top 17 substantially throughout its length for suctioning gas from inside the plenum chamber by the air flowing past the port as tractor 3 travels forward. For example, plenum chamber 13 may have a slot 18 running lengthwise along its upper surface, as shown in FIG. 4.

Figure 6:
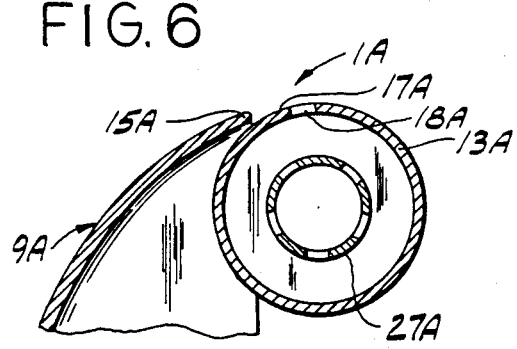
FIG. 6 is a view similar to FIG. 4, showing another embodiment of the invention.
Figure 7:
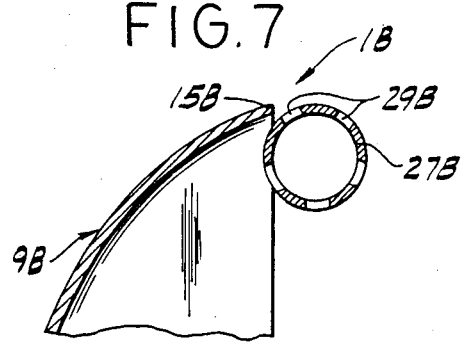
FIG. 7 is a view similar to FIGS. 4 and 6, showing yet another embodiment of the invention.

As shown in FIGS. 3 and 4, a vane (or "venturi wing") 19 preferably extends lengthwise along and over the top 17 of plenum chamber 13 to form a venturi throat 21, but it is contemplated that the back pressure reducer may be operated without a vane (as shown in FIGS. 6 and 7). More specifically, vane 19 may extend substantially throughout the length of plenum chamber 13 to fully complement slot 18, which also extends substantially throughout the length of the plenum chamber. Vane 19 is spaced from plenum chamber 13 by means of two end members 23, 25. Plenum chamber 13, vane 19 and end members 23, 25 may be integrally formed with air deflector 9, as shown in FIG. 4. Venturi throat 21 is configured for reducing air pressure at slot 18, whereby gas from plenum chamber 13 is suctioned by air flowing through the venturi throat when the tractor is moving forward.

Preferably, plenum chamber 13 has a pipe 27 therein, constituting connecting means, which has a plurality of perforations 29. Pipe 27 passes through end member 25 of the plenum chamber 13 where it is connected to the exhaust pipe 33 for the tractor engine. Thus exhaust gas from the engine flows through exhaust pipe 33 to perforated pipe 27, from which it is suctioned into plenum chamber 13 and then out through slot 18 by the low pressure at slot 18 caused by the venturi effect.

Plenum chamber 13, vane 19, and perforated pipe 27 constitute one means for aspirating exhaust gas from the engine exhaust system to reduce the exhaust back pressure on the engine.

FIG. 6 illustrates a second embodiment of the invention generally corresponding to the FIGS. 3-5 embodiment with the principal difference that the back pressure reducer, here designated 1A, does not have a vane. FIG. 6 additionally illustrates a plenum chamber 13A which is not formed integrally with air deflector 9A. The top 17A of plenum chamber 13A is shown tangent to, or at least at the level of, upper edge 15A of air deflector 9A for the flow of air relative to the plenum chamber over the top thereof as the tractor travels forward over the road. Plenum chamber 13A and perforated pipe 27A constitute another aspirating means.

FIG. 7 illustrates a third embodiment of the invention wherein the exhaust back pressure reducer, here designated 1B, comprises a perforated pipe 27B, constituting another aspirating means, having perforations 29B (at least a portion of which are at its top), but not a vane or plenum chamber. Preferably, pipe 27B is an extension of the exhaust pipe (i.e. is formed integrally therewith). This design also takes advantage of air flow over an air deflector at a lower cost though with somewhat less efficiency.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. An exhaust back pressure reducer for the internal combustion engine of a tractor for pulling a trailer, the tractor having a cab, an air deflector on the top of the cab for deflecting air over the top of the trailer as the tractor pulls the trailer over the road, and an exhaust system for the engine, said reducer comprising:
   means at the top of the air deflector on the top of the cab for aspirating gas from the engine exhaust system to reduce the exhaust back pressure on the engine, said aspirating means being positioned for flow therepast of air relative to the air deflector as the tractor travels forward, said aspirating means being ported for suctioning gas therefrom by the air flowing therepast;
   means for connecting said engine exhaust system to said aspirating means for aspiration of exhaust gas from said exhaust system as the tractor travels forward over the road with attendant relative flow of air up and back over the air deflector and the aspirating means on the top of the cab; and
   a vane extending laterally of the tractor along and over the top of said aspirating means, said vane being formed to provide in conjunction with the top of said aspirating means a venturi throat thereby to reduce air pressure at the top of the aspirating means and suction air therefrom.

2. An exhaust back pressure reducer as set forth in claim 1 wherein said aspirating means comprises means forming an elongate chamber extending laterally of the tractor adjacent the upper edge of the air deflector, said chamber-forming means being located adjacent said upper edge of the air deflector with the top of the chamber generally at the level of the upper edge of the air deflector for the flow of air relative to the chamber-forming means back over the top of the chamber-forming means as the tractor travels forward over the road, said chamber-forming means being ported at the top along its length for the aspiration of exhaust gas therefrom by said flow of air.

3. An exhaust back pressure reducer as set forth in claim 2 wherein said chamber-forming means is ported substantially throughout its length along the upper edge of the air deflector and the vane extends substantially throughout the length of the chamber-forming means.

4. An exhaust back pressure reducer as set forth in claim 3 wherein said chamber-forming means is ported by having a slot therein along its length.

5. An exhaust back pressure reducer for the internal combustion engine of a tractor for pulling a trailer, the tractor having a cab, an air deflector on the top of the cab for deflecting air over the top of the trailer as the tractor pulls the trailer over the road, and an exhaust system for the engine, said reducer comprising means at the top of the air deflector on the top of the cab for aspirating gas from the engine exhaust system to reduce the exhaust back pressure on the engine, said aspirating means being positioned for flow therepast of air relative to the air deflector as the tractor travels forward, said aspirating means being ported for suctioning gas therefrom by the air flowing therepast, and means for connecting said engine exhaust system to said aspirating means for aspiration of exhaust gas from said exhaust system as the tractor travels forward over the road with attendant relative flow of air up and back over the air deflector and the aspirating means on the top of the cab, said aspirating means comprising means forming an elongate chamber extending laterally of the tractor adjacent the upper edge of the air deflector, said chamber-forming means being located adjacent said upper edge of the air deflector with the top of the chamber generally at the level of the upper edge of the air deflector for the flow of air relative to the chamber-forming means back over the top of the chamber-forming means as the tractor travels forward over the road, said chamber-forming means being ported at the top along its length for the aspiration of exhaust gas therefrom by said flow of air, said chamber forming means having a vane extending lengthwise thereof along and over the top thereof formed to provide in conjunction with the top of said chamber-forming means a venturi throat.

6. An exhaust back pressure reducer as set forth in claim 5 wherein said chamber-forming means is ported substantially throughout its length along the upper edge of the air deflector and the vane extends substantially throughout the length of the chamber-forming means.

7. An exhaust back pressure reducer as set forth in claim 6 wherein said chamber-forming means is ported by having a slot therein along its length.

8. An exhaust back pressure reducer as set forth in claim 5 wherein the chamber-forming means is formed integrally with the air deflector.

9. An exhaust back pressure reducer as set forth in claim 6 wherein the chamber-forming means and the vane are formed integrally with the air deflector.

10. An exhaust back pressure reducer as set forth in claim 5 wherein the chamber-forming means is of elongate hollow cylindrical form, the air deflector curving up and back and, at its upper edge, being generally tangent to the top of said chamber-forming means.

11. An exhaust back pressure reducer as set forth in claim 10 wherein said chamber-forming means constitutes a plenum for exhaust gas and said connecting means comprises a perforated pipe extending lengthwise in said plenum.

12. An exhaust back pressure reducer as set forth in claim 10 wherein said means constitutes a pipe in extension of said engine exhaust system, said pipe being ported by having perforations at the top.

13. An exhaust back pressure reducer as set forth in claim 5 wherein said chamber-forming means extends laterally of the tractor adjacent the upper edge of the air deflector generally along the entire length of the top of the air deflector.

14. An exhaust back pressure reducer as set forth in claim 5 wherein said reducer is a separate component from said air deflector and readily attachable to said air deflector and said exhaust system.

* * * * *